(12) United States Patent
Jiang et al.

(10) Patent No.: US 10,191,319 B2
(45) Date of Patent: Jan. 29, 2019

(54) DISPLAY PANEL AND DISPLAY APPARATUS HAVING A PHOTOCHROMIC LAYER

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Liangliang Jiang, Beijing (CN); Songyang Jiang, Beijing (CN); Lei Guo, Beijing (CN); Ke Dai, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/533,186

(22) PCT Filed: Nov. 24, 2016

(86) PCT No.: PCT/CN2016/107069
§ 371 (c)(1),
(2) Date: Jun. 5, 2017

(87) PCT Pub. No.: WO2018/000702
PCT Pub. Date: Jan. 4, 2018

(65) Prior Publication Data
US 2018/0196303 A1    Jul. 12, 2018

(30) Foreign Application Priority Data
Jun. 27, 2016 (CN) .......................... 2016 1 0483697

(51) Int. Cl.
G02F 1/03        (2006.01)
G02F 1/1335    (2006.01)
G02F 1/1339    (2006.01)

(52) U.S. Cl.
CPC .... G02F 1/133512 (2013.01); G02F 1/13394 (2013.01); G02F 1/133514 (2013.01); G02F 2202/14 (2013.01); G02F 2203/62 (2013.01)

(58) Field of Classification Search
CPC ......... G02F 1/133512; G02F 1/133514; G02F 1/13394; G02F 2202/14
(Continued)

(56) References Cited

U.S. PATENT DOCUMENTS

2015/0346533 A1   12/2015   Park et al.
2016/0291432 A1   10/2016   Yan et al.

FOREIGN PATENT DOCUMENTS

CN      1790103 A       6/2006
CN    103474573 A   *  12/2013
(Continued)

OTHER PUBLICATIONS

International Search Report & Written Opinion dated Mar. 31, 2017 regarding PCT/CN2016/107069.
(Continued)

Primary Examiner — William Choi
(74) Attorney, Agent, or Firm — Intellectual Valley Law, P.C.

(57) ABSTRACT

The present application discloses a display panel having a subpixel region and an inter-subpixel region. The display panel includes a base substrate; and a photochromic layer on the base substrate at least partially in the subpixel region for preventing light leakage in the subpixel region.

19 Claims, 7 Drawing Sheets

(58) Field of Classification Search
USPC .................................................. 359/241, 243
See application file for complete search history.

(56) References Cited

FOREIGN PATENT DOCUMENTS

| | | | |
|---|---|---|---|
| CN | 103474573 A | | 12/2013 |
| CN | 104297985 A | | 1/2015 |
| JP | 200992881 A | | 4/2009 |
| KR | 20060135425 A | * | 12/2006 |
| KR | 20060135425 A | | 12/2006 |

OTHER PUBLICATIONS

First Office Action in the Chinese Patent Application No. 201610483697. 1, dated Jul. 12, 2018; English translation attached.

* cited by examiner

*Related Art*

DISPLAY PANEL AND DISPLAY APPARATUS HAVING A PHOTOCHROMIC LAYER

CROSS-REFERENCE TO RELATED APPLICATION

This application is a national stage application under 35 U.S.C. § 371 of International Application No. PCT/CN2016/107069 filed Nov. 24, 2016, which claims priority to Chinese Patent Application No. 201610483697.1, filed Jun. 27, 2016, the contents of which are incorporated by reference in the entirety.

TECHNICAL FIELD

The present invention relates to display technology, more particularly, to a display substrate and a display panel having a photochromic layer.

BACKGROUND

Liquid crystal display panel has found a wide variety of applications. Typically, a liquid crystal display panel includes a color filter substrate and an array substrate facing each other. Thin film transistors, gate lines, data lines, pixel electrodes, common electrodes, and common electrode lines are disposed on the array substrate and color filter substrate. Between the two substrates, a liquid crystal material is injected to form a liquid crystal layer. A post spacer layer is formed in the display panel to maintain a uniform cell gap between the array substrate and the color filter substrate over the entire display panel. One common problem associated with the liquid crystal display panel is light leakage. To prevent light leakage, a black matrix is placed on the color filter substrate. A liquid crystal display panel having a larger black matrix can better prevent light leakage. However, an aperture ratio of the liquid crystal display device is reduced by using a black matrix with a larger area.

SUMMARY

In one aspect, the present invention provides a display panel having a subpixel region and an inter-subpixel region, comprising a base substrate; and a photochromic layer on the base substrate at least partially in the subpixel region for preventing light leakage in the subpixel region.

Optionally, the photochromic layer comprises a plurality of photochromic blocks; the display panel has a spacer region configured to receive a spacer for maintaining a gap between a first display substrate and a second display substrate facing the first display substrate; the spacer region is in a light leakage preventing region; and one of the plurality of photochromic blocks is in the light leakage preventing region.

Optionally, a projection of the spacer region on the base substrate is completely within a projection of the one of the plurality of photochromic blocks on the base substrate.

Optionally, the projection of the one of the plurality of photochromic blocks on the base substrate surrounds and abuts a perimeter of the projection of the spacer region on the base substrate.

Optionally, the display panel further comprises a black matrix; wherein a projection of the spacer region on the base substrate overlaps with that of the black matrix; the light leakage preventing region includes a sub-region corresponding to a portion of the black matrix.

Optionally, the sub-region corresponding to the portion of the black matrix overlaps with a sub-region of the light leakage preventing region corresponding to the one of the plurality of photochromic blocks.

Optionally, the sub-region corresponding to the one of the plurality of photochromic blocks abuts two sides of the sub-region corresponding to the portion of the black matrix.

Optionally, the photochromic layer is configured to transition from a first state to a second state when exposed to a light intensity exceeding an intensity threshold; and the photochromic layer has a first light transmittance rate in the first state higher than a second light transmittance rate in the second state.

Optionally, the first state is a visible light transmissive state, and the second state is a visible light blocking state.

Optionally, the photochromic layer is configured to transition from the second state to the first state when the photochromic layer is no longer exposed to the light intensity exceeding the intensity threshold.

Optionally, the light leakage preventing region has a substantially the same external contour as the spacer region.

Optionally, the light leakage preventing region is concentric with the spacer region.

Optionally, the light leakage preventing region has a diameter or width greater than that of the spacer region by an amount in a range of approximately 2 µm to approximately 200 µm.

Optionally, the photochromic layer comprises silver halide.

Optionally, the photochromic layer further comprises a catalyst.

Optionally, the photochromic layer has a thickness in a range of approximately 0.1 µm to approximately 1 µm.

Optionally, the display panel further comprises an alignment film on a side of the photochromic layer distal to the base substrate for aligning liquid crystal molecules; wherein a projection of the photochromic layer on the base substrate at least partially overlaps with that of the alignment film; and the photochromic layer is configured to prevent light leakage due to a damage on the alignment film.

Optionally, the display panel further comprises a color filter on a side of the photochromic layer proximal to the base substrate.

Optionally, the photochromic layer is an integral layer covering at least the subpixel region.

In another aspect, the present invention provides a display apparatus comprising a display panel described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1A:
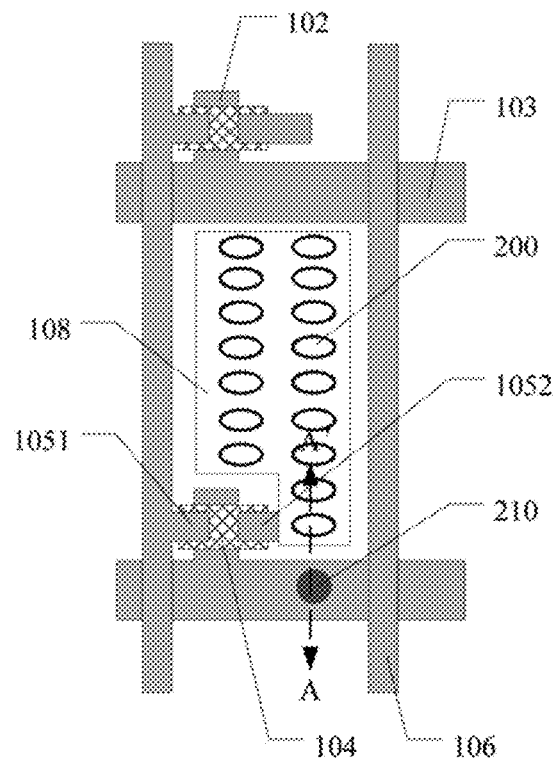
FIG. 1A is a diagram illustrating the structure of a conventional liquid crystal display panel.
Figure 1B:
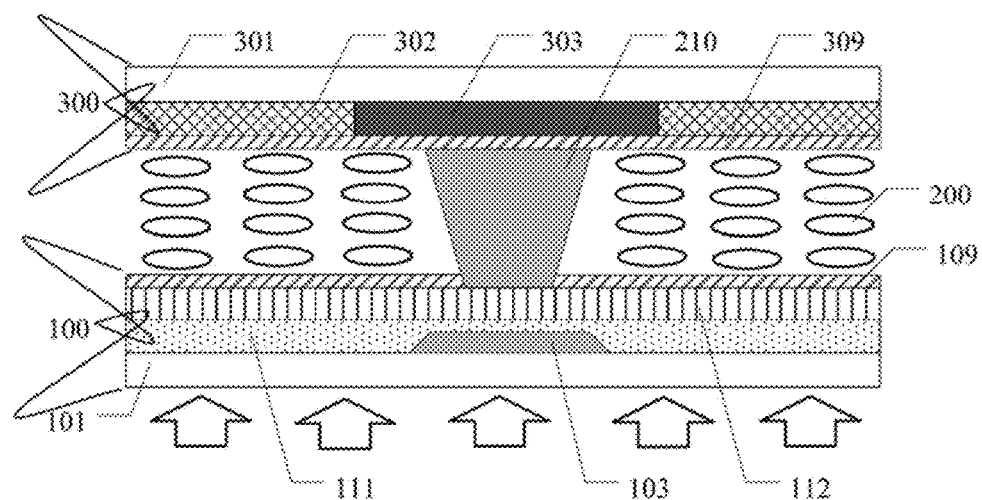
FIG. 1B shows a cross-sectional view along the A-A' direction of the display panel in FIG. 1A.
Figure 1C:
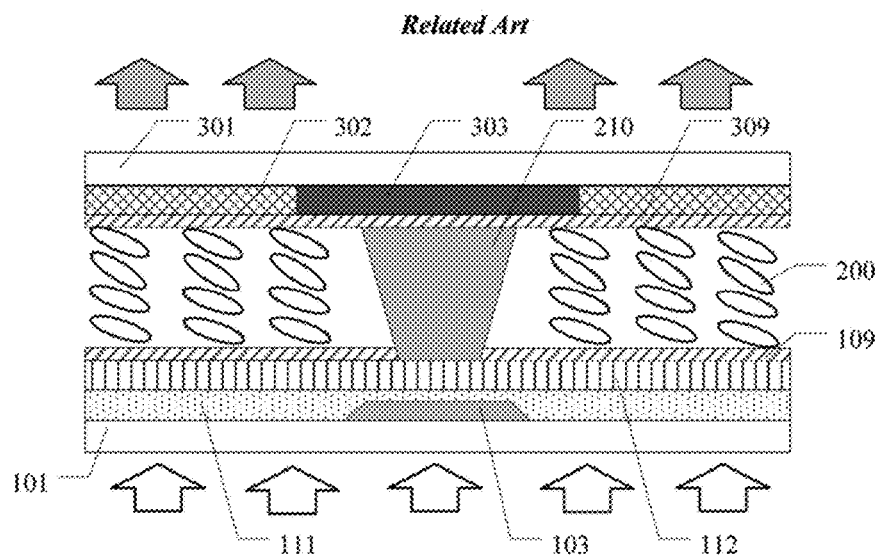
FIG. 1C shows a cross-sectional view along the A-A' direction of the display panel in FIG. 1A.

FIG. 1A is a diagram illustrating the structure of a conventional liquid crystal display panel. FIG. 1B shows a cross-sectional view along the A-A' direction of the display panel in FIG. 1A. FIG. 1C shows a cross-sectional view along the A-A' direction of the display panel in FIG. 1A. Referring to FIGS. 1A-1C, the conventional display panel includes an array substrate 100, a counter substrate 300 facing the array substrate 100, a liquid crystal layer 200 between the counter substrate 300 and the array substrate 100, and a spacer 210 for maintaining a spacing between the array substrate 100 and the counter substrate 300. The array substrate 100 includes a base substrate 101 of the array substrate, a gate electrode 102 and a gate line 103 on the base substrate 101, a gate insulating layer 111 on a side of the gate electrode 102 and the gate line 103 distal to the base substrate 101, an active layer 104 on a side of the gate insulating layer 111 distal to the gate electrode 102, a source electrode 1051 and a drain electrode 1052 on a side of the active layer 104 distal to the gate insulating layer 111, a pixel electrode 108, and an alignment film 109. The counter substrate 300 includes a second base substrate 301 of the counter substrate, a black matrix 303 on the second base substrate 301, a color filter 302, and an alignment film 309. A plurality of grooves for inducing liquid crystal molecules to align in a certain direction can be formed by rubbing a surface of the alignment film 109 or 309 in a fixed direction or by a photoalignment method. As shown in FIG. 1B, liquid crystal molecules are not rotated when the display panel is in a dark state, light cannot transmit through the display panel. As shown in FIG. 1C, when the display panel is in a bright state, the liquid crystal molecules are rotated by an electrical field, light transmits through the display panel. By having a color filter 302, a light of color can be achieved in the display panel.

The alignment film may be disposed on the array substrate (e.g., the alignment film 109 in FIG. 1B). Optionally, the alignment film is disposed on the counter substrate (e.g., the alignment film 309 in FIG. 1B). Optionally, both the array substrate and the counter substrate include an alignment film (e.g., the alignment film 109 on the array substrate 100 and the alignment film 309 on the counter substrate 300 in FIG. 1B).

Figure 2A:
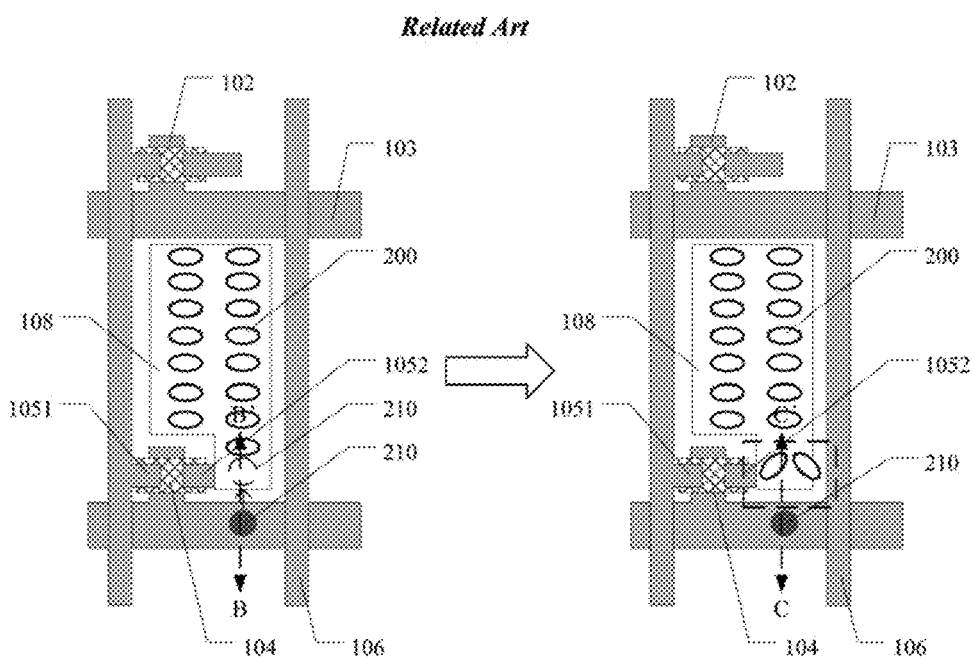
FIG. 2A is a diagram illustrating the structure of a conventional liquid crystal display panel in which a shift between the counter substrate and the array substrate occurs.
Figure 2B:
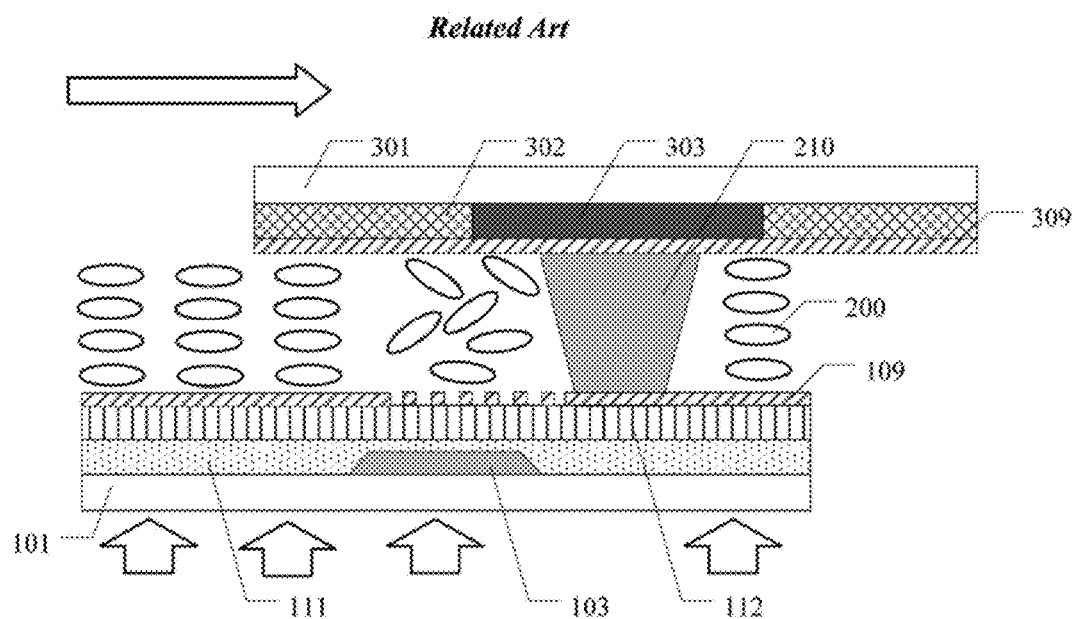
FIG. 2B shows a cross-sectional view along the B-B' direction of the display panel in FIG. 2A.
Figure 2C:
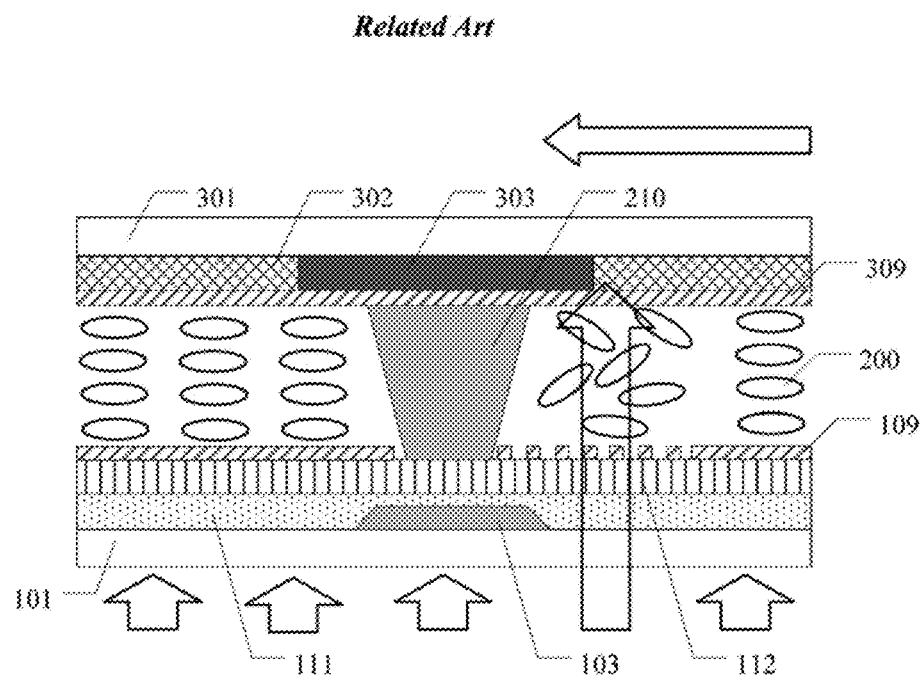
FIG. 2C shows a cross-sectional view along the C-C' direction of the display panel in FIG. 2A.
Figure 3:
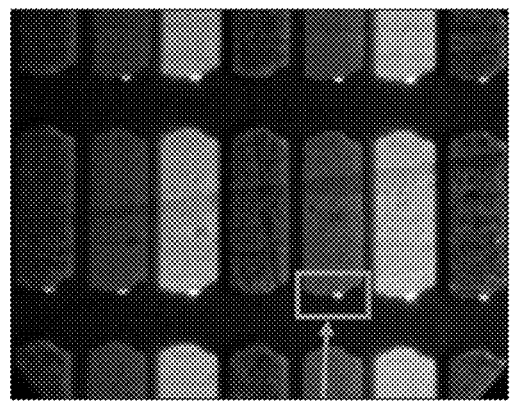
FIG. 3 illustrates light leakage due to a damage on the alignment film of a conventional liquid crystal display panel.

FIG. 2A is a diagram illustrating the structure of a conventional liquid crystal display panel in which a shift between the counter substrate and the array substrate occurs. FIG. 2B shows a cross-sectional view along the B-B' direction of the display panel in FIG. 2A. FIG. 2C shows a cross-sectional view along the C-C' direction of the display panel in FIG. 2A. Referring to FIGS. 2A-2C, when the display panel is subject to a large impact or a shearing force along the horizontal plane, the array substrate and the counter substrate shift relative to each other. The spacer 210 may shift from its original position (e.g., in an inter-subpixel region) into a shifted position (e.g., in a subpixel region). During the shifting, the spacer 210 may scratch the alignment film 109 in a subpixel region not covered by the black matrix 303. The damaged alignment film 109 loses its ability to induce alignment of the liquid crystal molecules 200. The liquid crystal molecules 200 in a region corresponding to the damaged alignment film cannot align normally, resulting in light leakage in the same region, as shown in FIG. 3.

Several possible methods of preventing light leakage caused by the shifted spacer have been tested in the present disclosure. In some embodiments, the light leakage may be reduced by increasing the width of the black matrix. However, this method results in a reduced aperture ratio and a lower light transmittance rate. In some embodiments, the spacer shift may be prevented by including a barrier surrounding the spacer. Optionally, the spacer may be disposed between the source electrode and the drain electrode thereby preventing the spacer shift. The issue with the barrier is that, once the spacer is dislocated from an original position defined by the barrier, it is difficult for the spacer to return to its original position.

Accordingly, the present invention provides, inter alia, a display substrate and a display panel that substantially obviate one or more of the problems due to limitations and disadvantages of the related art. In one aspect, the present disclosure provides a display substrate having a subpixel region and an inter-subpixel region. In some embodiments, the display substrate includes a base substrate and a photochromic layer on the base substrate at least partially in the subpixel region for preventing light leakage in the subpixel region. Optionally, the photochromic layer is disposed between a base substrate and an alignment film. The photochromic layer may be an integral layer that cover at least the subpixel region of the display substrate. For example, the photochromic layer may be substantially coextensive with the alignment film. Optionally, the photochromic layer includes a plurality of photochromic blocks. Optionally, the display substrate has a spacer region configured to receive a spacer for maintaining a spacing between the display substrate and a substrate facing the display substrate, the spacer region is in a light leakage preventing region, and one of the plurality of photochromic blocks is in the light leakage preventing region. Optionally, the light leakage preventing region further includes a portion of a black matrix.

In some embodiments, the photochromic layer is configured to transition from a first state to a second state when exposed to a light intensity exceeding an intensity threshold; and the photochromic layer has a first light transmittance rate in the first state higher than a second light transmittance rate in the second state. Optionally, the first state is a visible light transmissive state, and the second state is a visible light blocking state. Optionally, the photochromic layer is configured to transition from the second state to the first state when the photochromic layer is no longer exposed to the light intensity exceeding the intensity threshold. Optionally, when the light intensity is below the intensity threshold, any change in light transmittance rate induced by light in the photochromic layer is reversible. Optionally, when the light intensity is above the intensity threshold, any change in light transmittance rate induced by light in the photochromic layer is reversible. Optionally, the photochromic layer includes a photochromic material. Optionally, the photochromic layer further includes a catalyst for catalyzing a reaction to generate a product that renders the light transmittance rate of the photochromic layer lower.

As used herein, the term "subpixel region" refers to a light emission region of a subpixel, such as a region corresponding to a pixel electrode in a liquid crystal display, or a region corresponding to a light emissive layer in an organic light emitting diode display panel. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel.

As used herein, the term "inter-subpixel region" refers to a region between adjacent subpixel regions, such as a region corresponding to a black matrix in a liquid crystal display, or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

Figure 4:
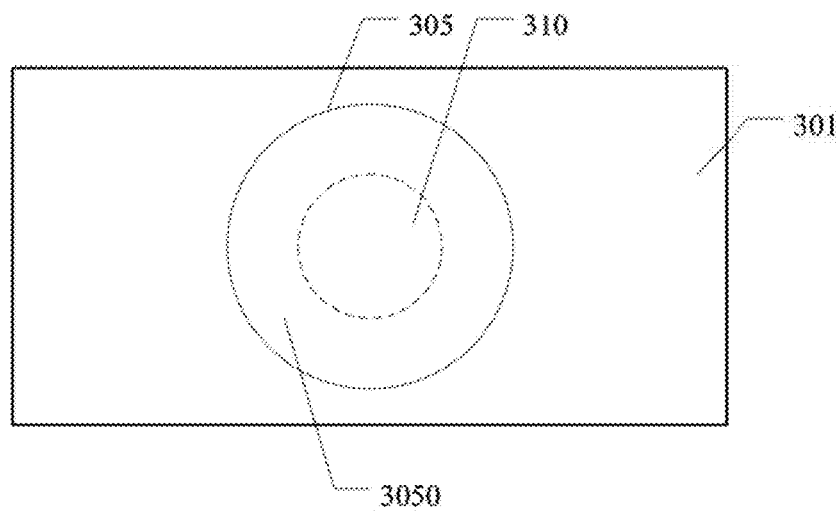
FIG. 4 is a diagram illustrating the structure of a display substrate in some embodiments according to the present disclosure.

FIG. 4 is a diagram illustrating the structure of a display substrate in some embodiments according to the present disclosure. Referring to FIG. 4, the display substrate in some embodiments includes a base substrate 301 and a photochromic block 305 of the photochromic layer on the base substrate 301. The display substrate has a spacer region 310 configured to receive a spacer for maintaining a spacing between the display substrate and a substrate facing the display substrate. The photochromic block 305 corresponds to a light leakage preventing region of the display substrate. As shown in FIG. 4, the spacer region 310 is completely within the light leakage preventing region. Optionally, the photochromic block 305 has a circular shape, and a projection of the spacer region 310 on the base substrate 301 is completely within a projection of the photochromic block 305 on the base substrate 301. Optionally, the photochromic block 305 has a ring shape, and the projection of the photochromic block 305 on the base substrate 301 surrounds and abuts a perimeter of the projection of the spacer region 310 on the base substrate 301. Optionally, the photochromic block 305 has a ring shape, and the projection of the photochromic block 305 on the base substrate 301 surrounds and partially overlaps with the projection of the spacer region 310 on the base substrate 301. Optionally, the photochromic block 305 has circular shape or a ring shape, and has a diameter greater than that of the spacer region by an amount in a range of approximately 2 μm to approximately 200 μm. Optionally, the photochromic block 305 has square shape or a rectangular shape, and has a width greater than that of the spacer region by an amount in a range of approximately 2 μm to approximately 200 μm.

Optionally, the display substrate further includes a spacer secured in the spacer region 310, the spacer region 310 is the region where the spacer is in contact with the display substrate. Optionally, the display substrate does not have a spacer secured onto the surface of the display substrate, and the spacer region 310 is a region into which a spacer from a second display substrate is disposed, when the display substrate and the second display substrate are assembly into a cell. Optionally, a projection of the spacer (either from the display substrate or from the second display substrate) on the base substrate 301 and that of the spacer region 310 completely overlaps, e.g., coextensive. Optionally, the spacer region 310 has a same shape and dimension as a cross-section of the spacer. Optionally, the spacer region 310 has a same shape and dimension as a side of the spacer in contact with the display substrate.

In one example, the display substrate is a counter substrate, and includes a spacer secured in the spacer region 310. In another example, the display substrate is a counter substrate not having a spacer secured onto its surface, and the second display substrate is an array substrate having a spacer. When the display substrate and the second display substrate are assembled into a cell, the spacer from the array substrate is disposed in the spacer region 310 in the counter substrate. When the spacer is secured in the counter substrate, the spacer may cause damage to the alignment film in the array substrate when a relative shift between the array substrate and the counter substrate occurs. When the spacer is secured in the array substrate, the spacer may cause damage to the alignment film in the counter substrate when a relative shift between the array substrate and the counter substrate occurs.

In the present display substrate, when exposed to light, the photochromic layer transitions from a higher transmittance state into a lower transmittance state. When light leakage occurs in a region covered by the photochromic layer (e.g., due to a damage in the alignment film), the photochromic layer transitions into a state having a low light transmittance rate (e.g., zero light transmittance rate), thereby reducing or eliminating light leakage in the region. When the photochromic layer is limited to a region covering or surrounding the spacer, it can effectively prevent light leakage due to the damage in the alignment film adjacent to the spacer (e.g., damages caused by the spacer shift). By limiting the photochromic layer to a small light leakage preventing region covering or surrounding the spacer, the display substrate can be made more cost-effective by using less photochromic materials. Optionally, the photochromic layer may be a layer extending throughout the display substrate, effectively preventing light leakage in any position of the display substrate.

In some embodiments, the photochromic layer is configured to transition from a first state to a second state when exposed to a light intensity exceeding an intensity threshold; and the photochromic layer has a first light transmittance rate in the first state higher than a second light transmittance rate in the second state. When the light intensity is below the intensity threshold, the photochromic layer does not transition to the second state, e.g., remains in a state having a low light transmittance rate. Thus, the photochromic layer may be designed to have an appropriate intensity threshold so that the photochromic layer only blocks light when light leakage occurs, and does not block or only minimally block light during normal image display. By selecting an appropriate intensity threshold, aperture ratio of the display substrate and a display panel having the display substrate will not be compromised.

Optionally, the photochromic layer does not have an intensity threshold. For example, the light transmittance rate of the photochromic layer gradually changes with the light intensity. In some display panel having the display substrate, light leakage is more significant when the display panel is in a dark state as compared to a bright state, and the photochromic layer only occupies a small area in the subpixel region, the intensity threshold may not be necessary.

In some embodiments, the intensity threshold is greater that a maximum light intensity transmitted through the display substrate when a display panel having the display substrate is normally displayed without light leakage, e.g., light leakage due to damages on the alignment film. Accordingly, during the normal image display, an intensity of light irradiated on the photochromic layer is lower than the intensity threshold. The intensity of light during the normal image display is not sufficiently high to induce the photochromic layer to transition from the first state to the second state, e.g., from a state having a high light transmittance rate to a state having a low light transmittance rate. However, when the alignment film is damaged, the light leaking through the liquid crystal layer in a region corresponding to the damaged alignment film has a higher intensity. The intensity threshold of the photochromic layer is set to be lower than the intensity of the leaking light. The leaking light induces the photochromic layer to transition from the first state to the second state, e.g., from a state having a high light transmittance rate to a state having a low light transmittance rate, thereby reducing or eliminating light leakage in the region.

Optionally, the intensity threshold is lower than the intensity of leaking light and higher that the intensity of light during normal image display, and the photochromic layer is induced to transition into a non-transparent state (e.g., visible light blocking state) when exposed to the leaking light. Optionally, the thickness of the photochromic can be selected such that the photochromic layer is induced to transition into a non-transparent state (e.g., visible light blocking state) when exposed to light having an intensity greater than the threshold intensity. Optionally, the photochromic layer has a thickness along a direction substantially perpendicular to the base substrate in a range of approximately 0.1 μm to approximately 1 μm.

Optionally, the intensity threshold is adjusted by changing a concentration of a photochromic material in the photochromic layer.

Referring to FIG. 4, in some embodiments, the photochromic block 305 is an integral block including a first portion and a second portion. The first portion corresponds to the spacer region 310, a projection of the first portion on the base substrate 301 completely overlaps with that of the spacer region 310. A projection of the second portion on the base substrate surrounds and abuts a perimeter of the projection of the spacer region 310 on the base substrate.

In some embodiments, the photochromic block 305 is a ring-shaped block, a projection of which surrounds and abuts a perimeter of the projection of the spacer region 310 on the base substrate.

In some embodiments, the photochromic block 305 is a ring-shaped block, a projection of which partially overlaps with the projection of the spacer region 310 on the base substrate.

Referring to FIG. 4, a projection of the photochromic block 305 on the base substrate 301 is concentric with that of the spacer region 310. Optionally, the photochromic block 305 has a same external contour as the spacer region 310. For example, the spacer region 310 may have a circular shape, and the photochromic block 305 has a circular shape or a ring shape. Optionally, the spacer region 310 may have a square shape, and the photochromic block 305 has a square shape or a hollow square shape. Optionally, the spacer region 310 may have a rectangular shape, and the photochromic block 305 has a rectangular shape or a hollow rectangular shape.

As shown in FIG. 4, the projection of the photochromic block 305 on the base substrate 301 has a same shape as that of the spacer region 310. By having this design, when the spacer region is substantially a circular shape, the photochromic block 305 can isotropically prevent light leakage due to damages caused by spacer shift. Optionally, the projection of the photochromic block 305 on the base substrate 301 does not necessarily have a same shape, but has a substantially the same external contour, it can effectively prevent light leakage isotropically. In one example, the projection of the photochromic block 305 on the base substrate 301 has a ring shape, and surrounds and abuts a perimeter of the projection of the spacer region 310 on the base substrate 301.

Referring to FIG. 4, the light leakage preventing region includes a first sub-region corresponding to the spacer region 310, and a second sub-region 3050. Optionally, the photochromic block 305 covers the entire light leakage preventing region. Optionally, the photochromic block 305 covers the second sub-region 3050, but not the first sub-region. Optionally, the photochromic block 305 covers the second sub-region 3050, and partially covers a portion of the first sub-region.

Figure 5:
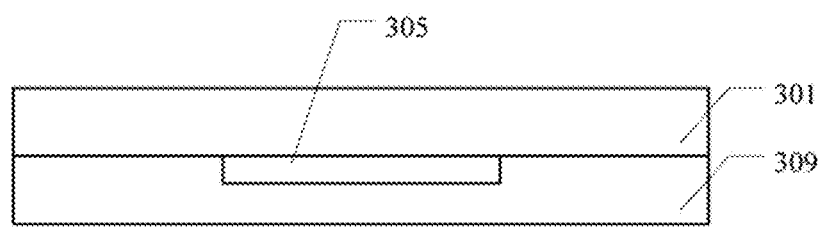
FIG. 5 is a cross-sectional view of a display substrate in some embodiments according to the present disclosure.

FIG. 5 is a cross-sectional view of a display substrate in some embodiments according to the present disclosure. Referring to FIG. 5, the display substrate in some embodiments further includes an alignment film 309. As shown in FIG. 5, the display substrate includes a photochromic block 305 on the base substrate 301, and an alignment film 309 on a side of the photochromic block 305 distal to the base substrate 301. The photochromic block 305 is sandwiched between the base substrate 301 and the alignment film 309.

Figure 6:
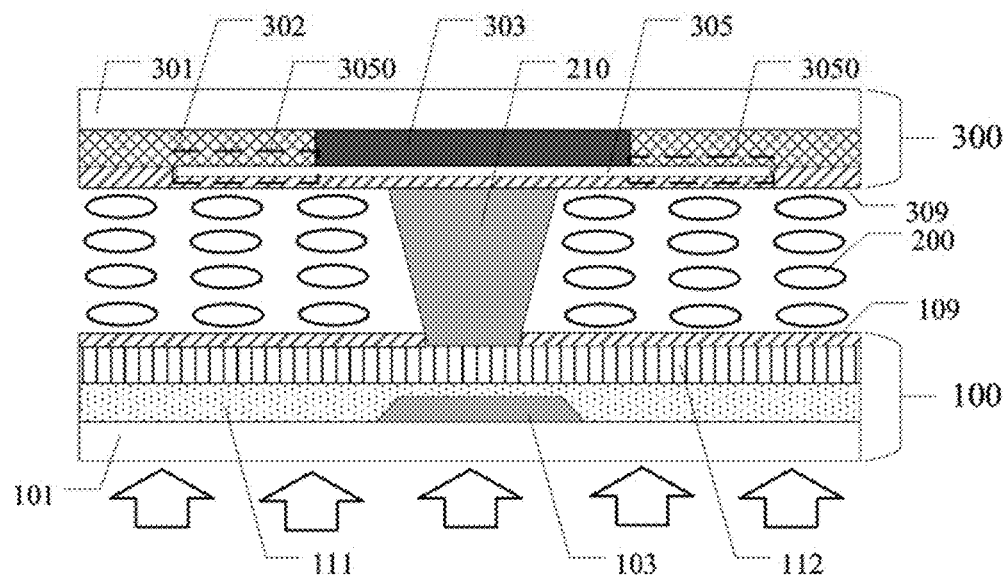
FIG. 6 is a cross-sectional view of a display apparatus in some embodiments according to the present disclosure.

FIG. 6 is a cross-sectional view of a display apparatus in some embodiments according to the present disclosure. Referring to FIG. 6, the display substrate 300 (a counter substrate in FIG. 6) in some embodiments further includes a color filter 302 on a side of the photochromic layer 305 proximal to the base substrate 301. By having the photochromic layer 305 disposed on a side of the color filter 302 distal to the base substrate 301, ambient light incident to the display substrate 300 (or the display apparatus having the display substrate 300) is filtered by the color filter 302 before it irradiates on the photochromic layer 305. This design obviates the photochromic effect in the photochromic layer 305 caused by the ambient light, preventing loss of aperture ratio due to a decrease of light transmittance rate in the photochromic layer 305 caused by ambient light irradiation. Optionally, the display substrate 300 includes additional layer such as a polarizer, further preventing undesired photochromic effect in the photochromic layer 305 caused by the ambient light.

Referring to FIG. 6, the display substrate 300 in some embodiments further includes a black matrix 303 on the base substrate 301. The black matrix 303 in FIG. 6 is on a side of the photochromic layer 305 proximal to the base substrate 301. Optionally, the black matrix 303 is on a side of the photochromic layer 305 distal to the base substrate 301. A projection of the spacer region on the base substrate overlaps with that of the black matrix 303. In one example, a projection of the spacer 210 in FIG. 6 on the base substrate 301 overlaps with that of the black matrix 303, e.g., the projection of the black matrix 303 on the base substrate 301 covers that of the spacer 210. The spacer region in FIG. 6 corresponds to a region in the display substrate 300 with which the spacer 210 is in contact. The spacer 210 in the display apparatus 1 of FIG. 6 may be optionally secured to the display substrate 300. Optionally, the spacer 210 is secured to the array substrate 100 facing the display substrate 300.

As shown in FIG. 6, the light leakage preventing region in some embodiments includes a first sub-region corresponding to the black matrix 303, and a second sub-region 3050. Optionally, the photochromic block 305 covers the entire light leakage preventing region, including the first sub-region and the second sub-region 3050. Optionally, the photochromic block 305 covers the second sub-region 3050, but not the first sub-region; and a projection of the photochromic block 305 on the base substrate 301 abuts two sides of that of the first sub-region corresponding to the black matrix 303. Optionally, the photochromic block 305 covers the second sub-region 3050, and partially covers a portion of the first sub-region; and a projection of the photochromic block 305 on the base substrate 301 partially overlaps with that of the first sub-region corresponding to the black matrix 303.

Figure 7:
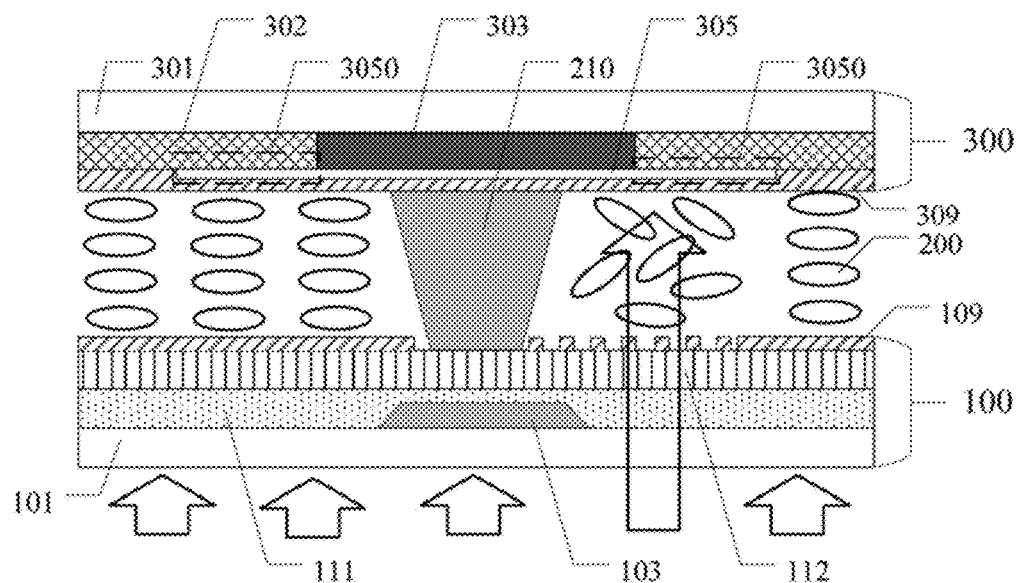
FIG. 7 is a cross-sectional view of a display apparatus having a damaged alignment film in some embodiments according to the present disclosure.

FIG. 7 is a cross-sectional view of a display apparatus having a damaged alignment film in some embodiments according to the present disclosure. Referring to FIG. 7, the black matrix 303 covers the spacer region corresponding to the spacer 210. When a relative shift between the array substrate 100 and the display substrate 300 occurs, the alignment film 309 in a subpixel region not covered by the black matrix 303 is scratched by the spacer 210. The damaged alignment film 109 loses its ability to induce proper alignment of the liquid crystal molecules 200. The liquid crystal molecules 200 in a region corresponding to the damaged alignment film cannot align normally, resulting in light leakage in the same region. As a result, the back light transmits through the liquid crystal layer in the region corresponding to the damaged alignment film with a very high transmittance rate, and irradiates on the photochromic block 305 in the second sub-region 3050. Upon exposure to the high intensity back light, the photochromic block 305 transitions from a higher transmittance state into a lower transmittance state (e.g., a substantially zero transmittance rate). The leaking light in the first sub-region of the light leakage preventing region (corresponding to the black matrix 303) is blocked by the black matrix 303. In the second sub-region 3050, the leaking light is effectively blocked by the photochromic block 305 in the lower transmittance state. Accordingly, the photochromic block 305 can be selectively disposed in the second sub-region 3050. Optionally, the photochromic block 305 covers both the first sub-region corresponding to the black matrix 303 and the second sub-region 3050.

By limiting the photochromic block 305 in the second sub-region 3050, the display substrate and the display apparatus can be made more cost-effective by using less photochromic materials. As compared to a display substrate having a wider black matrix, the present display substrate has a much higher aperture ratio, because the photochromic block 305 transitions into the lower transmittance state only in light leakage regions, and remain in the high transmittance state in normal display area. Thus, in a display apparatus having the present display substrate that functions normally without any light leakage, the aperture ratio is not affected at all by the presence of the photochromic block 305. Moreover, the photochromic block 305 can prevent light leakage caused by other defects, such as misalignment of the black matrix 303 and an offset between the array substrate and the counter substrate in a curved display apparatus.

Optionally, the light leakage preventing region has a diameter or width greater than that of the spacer region by an amount in a range of approximately 2 µm to approximately 200 µm. Optionally, the light leakage preventing region has a diameter or width greater than that of the black matrix by an amount in a range of approximately 2 µm to approximately 200 µm. Optionally, the second sub-region 3050 of the light leakage preventing region has a width in a range of approximately 1 µm to approximately 100 µm. In one example, the second sub-region 3050 is a ring-shaped region, the width of the ring is in a range of approximately 1 µm to approximately 100 µm. Optionally, the second sub-region 3050 of the light leakage preventing region includes two square-shaped regions or two rectangular regions on two sides of the black matrix 303 along a width direction of the black matrix, and each of the two square-shaped regions or two rectangular regions has a width in a range of approximately 1 µm to approximately 100 µm.

Various appropriate photochromic materials may be used for making the photochromic layer. Examples of appropriate photochromic materials include, but are not limited to, inorganic photochromic materials such as tungsten trioxide and silver halide, and organic photochromic materials such as spiropyrane compounds, diarylethene compounds, and azobenzene compounds.

In some embodiments, the photochromic layer is made of a material including silver bromide. When exposed to light, silver bromide decomposes and generate silver, which absorbs visible light. When the concentration of silver reaches a threshold value, the photochromic layer having silver bromide transitions into a low light transmittance state having a low light transmittance rate or zero transmittance rate, absorbing a majority of light irradiated on the photochromic layer.

Figure 8:
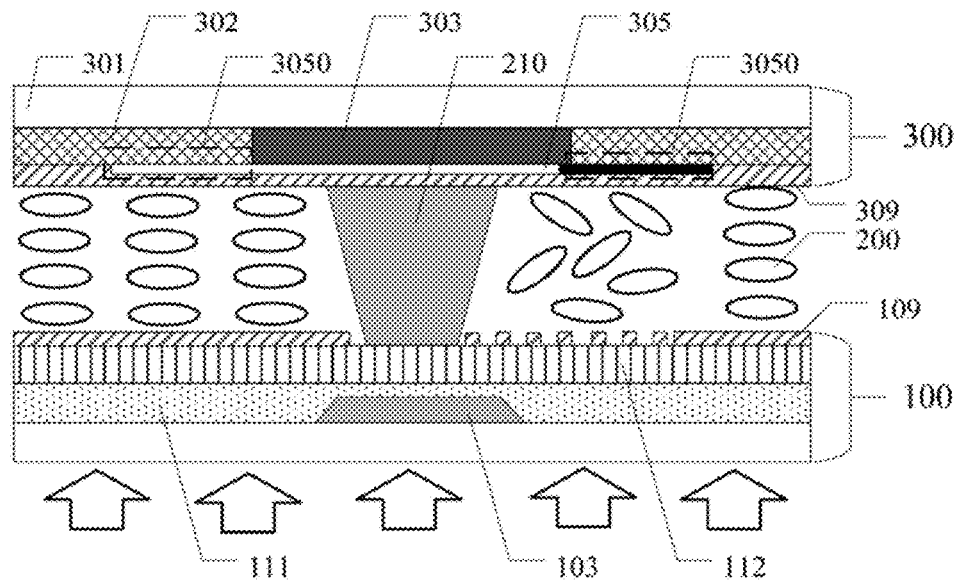
FIG. 8 is a cross-sectional view of a display apparatus having a damaged alignment film in some embodiments according to the present disclosure.

FIG. 8 is a cross-sectional view of a display apparatus having a damaged alignment film in some embodiments according to the present disclosure. Referring to FIG. 8, a photochromic block 305 having silver halide is disposed in a light leakage preventing region that covers the spacer 210. When the display apparatus is subject to an external force resulting in a damage on the alignment film 109 caused by a movement of the spacer 210, the liquid crystal molecules 200 in the region corresponding to the damaged alignment film 109 cannot function properly as a light valve. The high-intensity back light transmits through the liquid crystal molecules 200 in the region and irradiates on the silver halide in the photochromic block 305, converting silver halide into silver (see, e.g., a black block in the second sub-region 3050 on the right side of the spacer 210). Silver in the photochromic block 305 absorbs the leaking light. In region where the alignment film 109 remains intact, the liquid crystal molecules 200 functions properly as a light valve, silver halide in the photochromic block 305 remains in the form of transparent silver halide (see, e.g., a transparent block in the second sub-region 3050 on the left side of the spacer 210) for normal image display.

Figure 9:
FIG. 9 illustrates the working principle of a photochromic layer in some embodiments according to the present disclosure.

In some embodiments, when the light intensity is below the intensity threshold, any change in light transmittance rate induced by light in the photochromic layer is reversible. FIG. 9 illustrates the working principle of a photochromic layer in some embodiments according to the present disclosure. Referring to FIG. 9, the photochromic material is silver bromide. When photochromic layer is not exposed to light, silver and bromide react with each other to generate a silver bromide product, in which silver exists in an ion form. Silver ion does not absorb visible light, thus the photochromic layer transitions back into a high light transmittance state having a high light transmittance rate.

In some embodiments, damages on the alignment film is not permanent. For example, the alignment film is typically elastic, and deformation in the alignment film is reversible. After period of time after the alignment film is damaged, it may resume its original shape or a shape that enables its ability to properly align the liquid crystal molecules 200. The properly aligned liquid crystal molecules 200 can function as a light valve again, and the photochromic layer is no longer exposed to high intensity back light. As a result, the photochromic layer transitions back to a high light transmittance state having a high light transmittance rate. The display apparatus may achieve an aperture ratio substantially the same as that in a display apparatus having undamaged alignment film.

In some embodiments, the photochromic layer further includes a catalyst for increasing the reaction rate of the photochromic materials therein. In one example, the photochromic material includes silver bromide, and the catalyst is copper oxide. When the photochromic layer is not exposed to high intensity light, the catalyst copper oxide catalyzes the reaction between silver and bromide to generate silver bromide with a greater reaction rate. By having a catalyst in the photochromic layer, the photochromic layer can transition quickly from a low light transmittance state to a high light transmittance state (e.g., a transparent state).

In another aspect, the present disclosure provides a method of fabricating a display substrate. In some embodiments, the method includes forming a photochromic layer on a base substrate at least partially in the subpixel region for preventing light leakage in the subpixel region. Optionally, the step of forming the photochromic layer includes forming a plurality of photochromic blocks, each of which is formed in a light leakage preventing region. The light leakage preventing region includes at least a spacer region configured to receive a spacer for maintaining a spacing between the display substrate and a substrate facing the display substrate. Optionally, the method further includes forming a spacer in the spacer region.

As used herein, the term "light leakage preventing region" refers to a region encompassing the spacer region, the photochromic layer is disposed in the light leakage preventing region. Optionally, when the spacer region does not overlap with a black matrix region, the light leakage preventing region consists essentially of the photochromic layer. Optionally, when the spacer region overlaps with a black matrix region, the light leakage preventing region includes the photochromic layer and a portion of the black matrix region. Optionally, the light leakage preventing region has a diameter or width greater than that of the spacer region by an amount in a range of approximately 2 µm to approximately 200 µm.

Optionally, the light leakage preventing region has a substantially the same external contour as the spacer region. Optionally, the light leakage preventing region is concentric with the spacer region.

In some embodiments, the step of forming the photochromic layer is performed by sputtering (e.g., magnetron sputtering) a photochromic material on the base substrate thereby forming a photochromic material layer, and patterning the photochromic material layer to form a photochromic layer. Specifically, the step of patterning includes forming a photoresist layer (e.g., having a thickness of approximately 1 µm to approximately 3 µm) on the photochromic material layer, exposing the photoresist layer using a mask plate having a pattern corresponding to the photochromic layer, developing the exposed photoresist layer, and etching the photochromic material layer thereby forming the photochromic layer. Optionally, the photochromic layer is formed to have a thickness in a range of approximately 0.1 µm to approximately 1 µm. Optionally, the photochromic layer is made of a material including silver halide. Optionally, the photochromic layer is made of a material further including a catalyst.

In a display substrate fabricated by the present method, when exposed to light, the photochromic layer transitions from a higher transmittance state into a lower transmittance state. When light leakage occurs in a region covered by the photochromic layer (e.g., due to a damage in the alignment film), the photochromic layer transitions into a state having a low light transmittance rate (e.g., zero light transmittance rate), thereby reducing or eliminating light leakage in the region.

In some embodiments, the photochromic layer in a display substrate fabricated by the present method is configured to transition from a first state to a second state when exposed to a light intensity exceeding an intensity threshold; and the photochromic layer has a first light transmittance rate in the first state higher than a second light transmittance rate in the second state. When the light intensity is below the intensity threshold, the photochromic layer does not transition to the second state, e.g., remains in a state having a low light transmittance rate. Thus, the photochromic layer may be designed to have an appropriate intensity threshold so that the photochromic layer only blocks light when light leakage occurs, and does not block or only minimally block light during normal image display. By selecting an appropriate intensity threshold, aperture ratio of the display substrate and a display panel having the display substrate will not be compromised.

In some embodiments, the photochromic layer is configured to transition from a first state to a second state when exposed to a light intensity exceeding an intensity threshold; and the photochromic layer has a first light transmittance rate in the first state higher than a second light transmittance rate in the second state. Optionally, the first state is a visible light transmissive state, and the second state is a visible light blocking state. Optionally, the photochromic layer is configured to transition from the second state to the first state when the photochromic layer is no longer exposed to the light intensity exceeding the intensity threshold.

Optionally, the intensity threshold is adjusted by changing a concentration of a photochromic material in the photochromic layer.

In some embodiments, a projection of the spacer region on the base substrate is completely within a projection of the one of the plurality of photochromic blocks formed on the base substrate.

In some embodiments, the plurality of photochromic blocks are formed so that the projection of the one of the plurality of photochromic blocks on the base substrate surrounds and abuts a perimeter of the projection of the spacer region on the base substrate.

In some embodiments, the method further includes forming a black matrix. Optionally, the black matrix is formed so that a projection of the spacer region on the base substrate overlaps with that of the black matrix. Optionally, the light leakage preventing region includes a sub-region corresponding to a portion of the black matrix. Optionally, the sub-region corresponding to the portion of the black matrix overlaps with a sub-region of the light leakage preventing region corresponding to the one of the plurality of photochromic blocks. Optionally, the sub-region corresponding to the one of the plurality of photochromic blocks abuts two sides of the sub-region corresponding to the portion of the black matrix.

In some embodiments, the method further includes forming an alignment film on a side of the photochromic layer distal to the base substrate for aligning liquid crystal molecules. Optionally, a projection of the photochromic layer on the base substrate at least partially overlaps with that of the alignment film. Optionally, the photochromic layer is configured to prevent light leakage due to a damage on the alignment film.

Optionally, the photochromic layer is formed as an integral layer covering at least the subpixel region.

In another aspect, the present disclosure provides a display apparatus having a display substrate described herein or fabricated by a method described herein. The display apparatus further includes a second display substrate facing the display substrate, and a liquid crystal layer between the display substrate and the second display substrate.

Optionally, the display substrate is a counter substrate, and the second display substrate is an array substrate. Optionally, the spacer is secured to the counter substrate in the display apparatus. Optionally, the spacer is secured to the array substrate in the array substrate in the display apparatus, when the counter substrate and the array substrate are assembled into a cell, the spacer from the array substrate is disposed in the spacer region in the counter substrate.

Optionally, the counter substrate includes an alignment film. Optionally, the array substrate includes an alignment film. Optionally, the counter substrate includes an alignment film, and the array substrate includes an alignment film. Optionally, the alignment film is made of polyimide.

Figure 10:
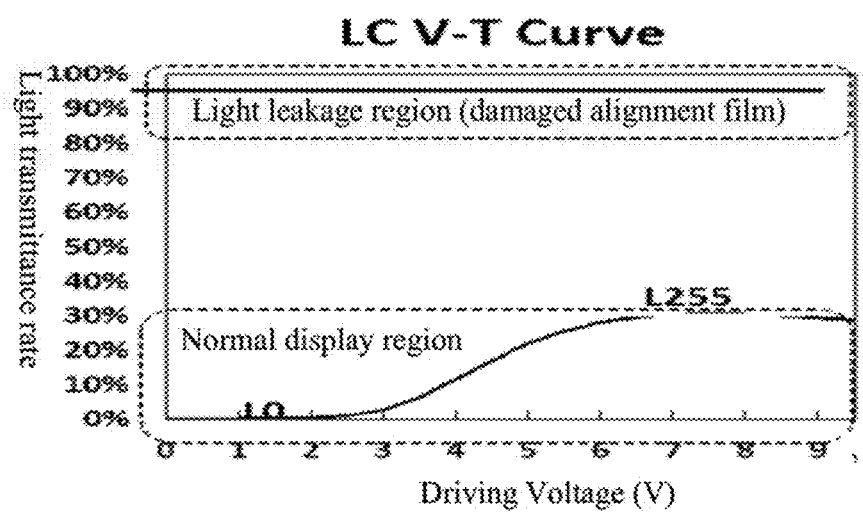
FIG. 10 is a chart illustrating a correlation between light transmittance rate and the driving voltage in a normal display region and an abnormal display region.

FIG. 10 is a chart illustrating a correlation between light transmittance rate and the driving voltage in a normal display region and an abnormal display region. Referring to FIG. 10, in the normal display region (e.g., a region where the alignment film remains intact), the light transmittance rate increases with the increase of the driving voltage. For example, the light transmittance rate increases from 0% (corresponding to a "L0" brightness level in the display apparatus) to approximately 30% (corresponding to a "L255" brightness level in the display apparatus). In the light leakage region, the alignment film is damaged and loses its ability to properly align the liquid crystal molecules, the light transmittance rate is above 90% regardless what the driving voltage is. Thus, the majority of back light transmits through the liquid crystal layer and irradiates on the photochromic layer. Accordingly, the intensity threshold of the photochromic layer may be set to a value that is higher than a maximum light intensity transmitted through the display substrate when a display panel having the display substrate is normally displayed without light leakage (corresponding to the "L255" brightness level). During normal image display, the light intensity is not sufficiently high to induce the photochromic layer to transition from a high light transmittance state to a low light transmittance state. The presence of the photochromic layer does not affect the normal image display, and the aperture ratio of the display apparatus is not compromised. When the alignment film is damaged, the light transmitted through the liquid crystal layer has an intensity higher than the intensity threshold, inducing the photochromic layer to transition from a high light transmittance state to a low light transmittance state, thereby reducing or eliminating light leakage in the region where the alignment film is damaged. Because the photochromic layer is converted into the low light transmittance state only in the light leakage region, loss of aperture ratio is minimal.

Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel having a subpixel region and an inter-subpixel region, comprising:
a base substrate; and
a photochromic layer on the base substrate at least partially in the subpixel region for preventing light leakage in the subpixel region;
wherein the photochromic layer comprises a plurality of photochromic blocks;

the display panel has a spacer region configured to receive a spacer for maintaining a gap between a first display substrate and a second display substrate facing the first display substrate;

the spacer region is in a light leakage preventing region; and one of the plurality of photochromic blocks is in the light leakage preventing region.

2. The display panel of claim 1, wherein a projection of the spacer region on the base substrate is completely within a projection of the one of the plurality of photochromic blocks on the base substrate.

3. The display panel of claim 1, wherein the projection of the one of the plurality of photochromic blocks on the base substrate surrounds and abuts a perimeter of the projection of the spacer region on the base substrate.

4. The display panel of claim 1, further comprising a black matrix;

wherein a projection of the spacer region on the base substrate overlaps with that of the black matrix;

the light leakage preventing region includes a sub-region corresponding to a portion of the black matrix.

5. The display panel of claim 4, wherein the sub-region corresponding to the portion of the black matrix overlaps with a sub-region of the light leakage preventing region corresponding to the one of the plurality of photochromic blocks.

6. The display panel of claim 4, wherein the sub-region corresponding to the one of the plurality of photochromic blocks abuts two sides of the sub-region corresponding to the portion of the black matrix.

7. The display panel of claim 1, wherein the photochromic layer is configured to transition from a first state to a second state when exposed to a light intensity exceeding an intensity threshold; and the photochromic layer has a first light transmittance rate in the first state higher than a second light transmittance rate in the second state.

8. The display panel of claim 7, wherein the first state is a visible light transmissive state, and the second state is a visible light blocking state.

9. A display panel of claim 8, wherein the photochromic layer is configured to transition from the second state to the first state when the photochromic layer is no longer exposed to the light intensity exceeding the intensity threshold.

10. The display panel of claim 1, wherein the light leakage preventing region has a substantially the same external contour as the spacer region.

11. The display panel of claim 1, wherein the light leakage preventing region is concentric with the spacer region.

12. The display panel of claim 1, wherein the light leakage preventing region has a diameter or width greater than that of the spacer region by an amount in a range of approximately 2 µm to approximately 200 µm.

13. The display panel of claim 1, wherein the photochromic layer comprises silver halide.

14. The display panel of claim 13, wherein the photochromic layer further comprises a catalyst.

15. The display panel of claim 1, wherein the photochromic layer has a thickness in a range of approximately 0.1 µm to approximately 1 µm.

16. The display panel of claim 1, further comprising:

an alignment film on a side of the photochromic layer distal to the base substrate for aligning liquid crystal molecules;

wherein a projection of the photochromic layer on the base substrate at least partially overlaps with that of the alignment film; and the photochromic layer is configured to prevent light leakage due to a damage on the alignment film.

17. The display panel of claim 1, further comprising a color filter on a side of the photochromic layer proximal to the base substrate.

18. The display panel of claim 1, wherein the photochromic layer is an integral layer covering at least the subpixel region.

19. A display apparatus, comprising a display panel of claim 1.

* * * * *